United States Patent
Narula et al.

(10) Patent No.: US 11,678,266 B2
(45) Date of Patent: Jun. 13, 2023

(54) USING A WIFI WAIT INDICATOR FOR BLUETOOTH TRAFFIC PERSISTENCE

(71) Applicant: Dell Products L.P., Round Rock, TX (US)

(72) Inventors: Harpreet S. Narula, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 185 days.

(21) Appl. No.: 17/134,265

(22) Filed: Dec. 26, 2020

(65) Prior Publication Data

US 2022/0210735 A1    Jun. 30, 2022

(51) Int. Cl.
*H04W 52/02*        (2009.01)
*H04W 4/80*         (2018.01)
*H04L 1/00*         (2006.01)
*H04W 84/12*        (2009.01)

(52) U.S. Cl.
CPC ....... *H04W 52/0216* (2013.01); *H04L 1/0071* (2013.01); *H04W 4/80* (2018.02); *H04W 84/12* (2013.01)

(58) Field of Classification Search
CPC ............ H04W 52/0216; H04W 4/80; H04W 72/1215; H04W 72/1263; H04L 1/0071
See application file for complete search history.

(56) References Cited

U.S. PATENT DOCUMENTS

| | | | | |
|---|---|---|---|---|
| 2013/0142059 A1* | 6/2013 | Di Girolamo | ........ | H04W 88/10 370/252 |
| 2015/0365179 A1* | 12/2015 | Quiet | ....................... | H04B 1/38 375/219 |
| 2019/0174418 A1* | 6/2019 | Kencharla | ............. | H04L 5/0053 |
| 2020/0229215 A1* | 7/2020 | Kondareddy | ..... | H04W 72/0446 |
| 2020/0295906 A1* | 9/2020 | An | ....................... | H04W 52/244 |
| 2021/0076402 A1* | 3/2021 | Li | ........................... | H04L 5/0055 |
| 2022/0022132 A1* | 1/2022 | Knaappila | ......... | H04W 52/0216 |
| 2022/0132523 A1* | 4/2022 | Lee | ................... | H04W 72/1215 |

OTHER PUBLICATIONS

International Search Report and Written Opinion for PCT Application No. PCT/US2021/029805, dated Sep. 23, 2021.
(Continued)

*Primary Examiner* — Jung Liu
(74) *Attorney, Agent, or Firm* — Terrile, Cannatti & Chambers; Stephen A. Terrile

(57) ABSTRACT

A system, method, and computer-readable medium are disclosed for performing a traffic routing operation. The traffic routing operation includes: establishing a Bluetooth connection, the Bluetooth connection comprising a plurality of Bluetooth packets; establishing a WiFi connection, the WiFi connection comprising a plurality of WiFi packets and an associated wait indicator; identifying a plurality of wake sessions using the associated wait indicator; configuring a Bluetooth channel configuration; and, configuring a WiFi channel configuration using the associated wake indicator and the plurality of wake sessions, the configuring taking into account the Bluetooth channel configuration, the configuring interleaving the plurality of WiFi packets and plurality of Bluetooth packets.

20 Claims, 10 Drawing Sheets

(56) References Cited

OTHER PUBLICATIONS

Nurchis, Maddalena et al., Target Wake Time: Scheduled Access in IEEE 802.11ax WLANs, IEEE Wireless Communications, Coordinated Science Laboratory; Dept. Electrical and Computer Engineering: University of Illinois at Urbana-Champaign, vol. 26, No. 2, Apr. 1, 2019, pp. 142-150.
Woolley, Martin, Bluetooth: Bluetooth Core Specification Version 5.2 Feature Overview, retrieved from the Internet, Dec. 9, 2020, section 3.1.3, pp. 28-29, section 3.2, pp. 30-37.

\* cited by examiner

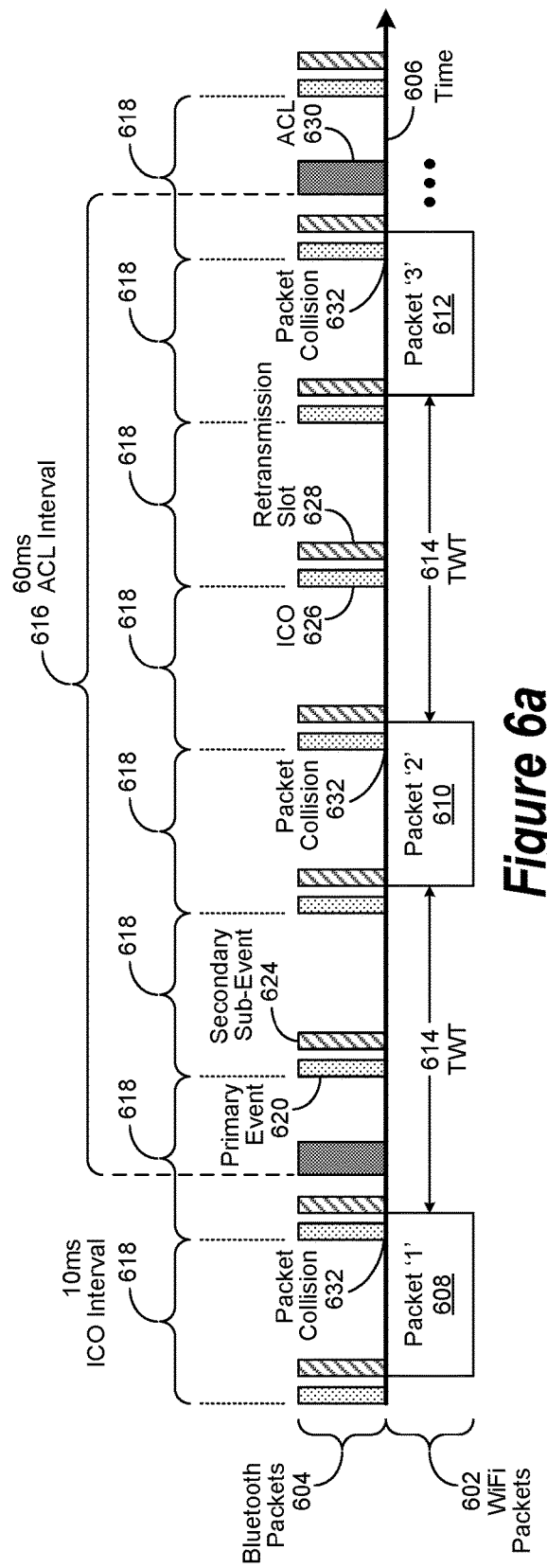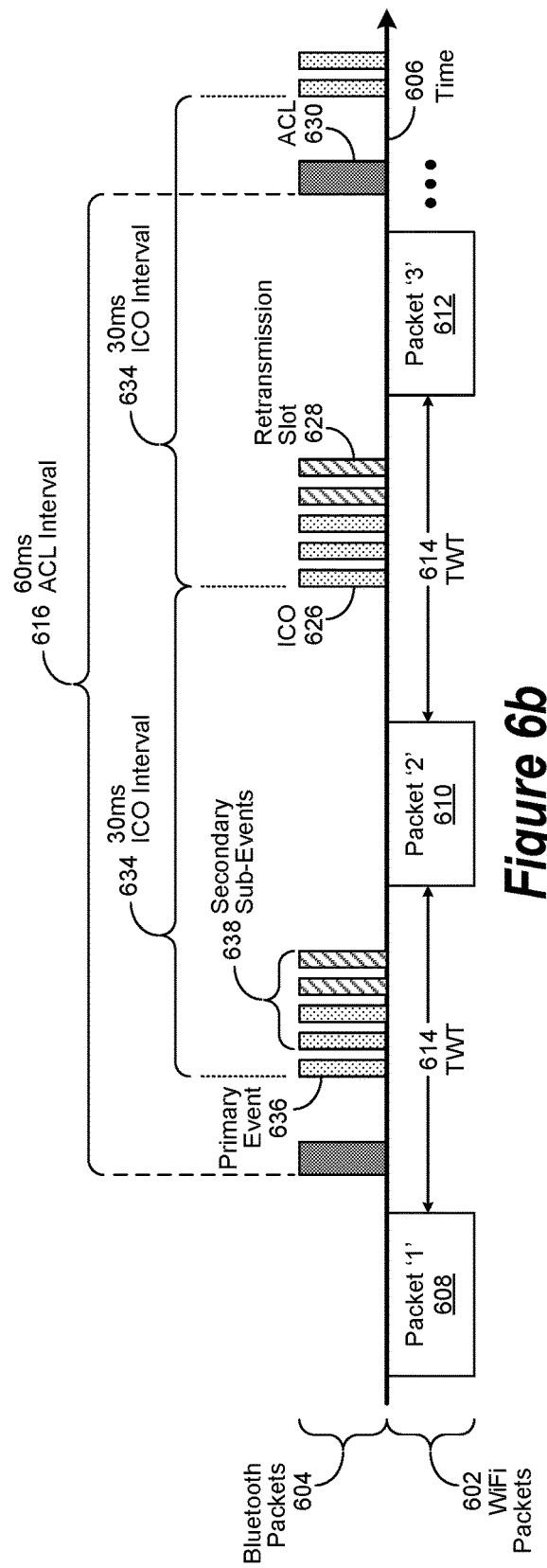

USING A WIFI WAIT INDICATOR FOR BLUETOOTH TRAFFIC PERSISTENCE

BACKGROUND OF THE INVENTION

Field of the Invention

The present invention relates to information handling systems. More specifically, embodiments of the invention relate to performing a network traffic routing operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a traffic routing operation, comprising: establishing a Bluetooth connection, the Bluetooth connection comprising a plurality of Bluetooth packets; establishing a WiFi connection, the WiFi connection comprising a plurality of WiFi packets and an associated wait indicator; identifying a plurality of wake sessions using the associated wait indicator; configuring a Bluetooth channel configuration; and, configuring a WiFi channel configuration using the associated wake indicator and the plurality of wake sessions, the configuring taking into account the Bluetooth channel configuration, the configuring interleaving the plurality of WiFi packets and plurality of Bluetooth packets.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: establishing a Bluetooth connection, the Bluetooth connection comprising a plurality of Bluetooth packets; establishing a WiFi connection, the WiFi connection comprising a plurality of WiFi packets and an associated wait indicator; identifying a plurality of wake sessions using the associated wait indicator; configuring a Bluetooth channel configuration; and, configuring a WiFi channel configuration using the associated wake indicator and the plurality of wake sessions, the configuring taking into account the Bluetooth channel configuration, the configuring interleaving the plurality of WiFi packets and plurality of Bluetooth packets.

In another embodiment the invention relates to a computer-readable storage medium embodying computer program code, the computer program code comprising computer executable instructions configured for: establishing a Bluetooth connection, the Bluetooth connection comprising a plurality of Bluetooth packets; establishing a WiFi connection, the WiFi connection comprising a plurality of WiFi packets and an associated wait indicator; identifying a plurality of wake sessions using the associated wait indicator; configuring a Bluetooth channel configuration; and, configuring a WiFi channel configuration using the associated wake indicator and the plurality of wake sessions, the configuring taking into account the Bluetooth channel configuration, the configuring interleaving the plurality of WiFi packets and plurality of Bluetooth packets.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 6a and 6b show the performance of packet timing and sequencing arbitration operations to reduce instances of packet collision in concurrent streams of WiFi and Bluetooth network traffic;

DETAILED DESCRIPTION

Figure 1:
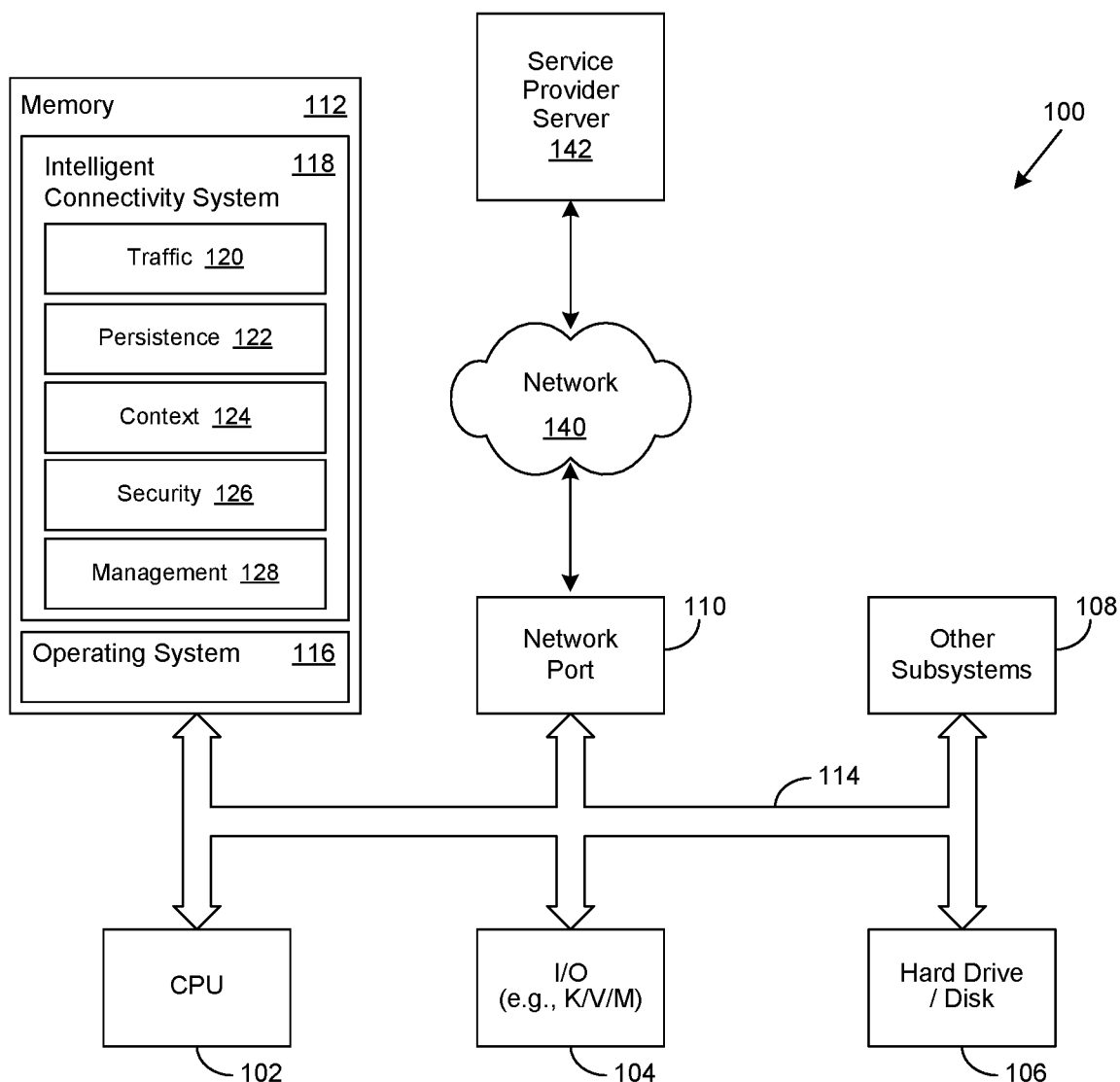
FIG. 1 shows a general illustration of components of an information handling system as implemented in the system and method of the present invention.

A system, method, and computer-readable medium are disclosed for performing a network traffic routing operation. Certain aspects of the invention reflect an appreciation that there is an increasing need to efficiently get data from where it may be stored or generated to where it is needed, whether that be in a data center, in the cloud, on the network edge, or a combination thereof. Certain aspects of the invention likewise reflect an appreciation that there is a growing proliferation of network-enabled devices and network connectivity options. These network connectivity options include Personal Area Networks (PANs), such as Bluetooth, Wireless Local Area Networks (WLANs), such as Wireless Fidelity (WiFi) networks, Wireless Wide Area Networks (WWANs), such as 3G, 4G, and 5G cellular networks, satellite networks, and wired networks, such as traditional LANs, and Wide Area Networks (WANs), such as the Internet.

Certain aspects of the invention reflect an appreciation that today's network-enabled productivity, collaboration, work, and entertainment activities are increasingly occurring anywhere and at any time. Likewise, certain aspects of the invention reflect an appreciation that such activities are becoming a part of everyday life, and as a result, are leading to an increased expectation of network connectivity wherever and whenever needed. Certain aspects of the invention reflect an appreciation that users have likewise come to expect network connectivity, regardless of the underlying technology used to provide it, to be seamless, reliable, and secure.

Certain aspects of the invention reflect an appreciation that Wireless Fidelity (WiFi) network traffic is non-periodic in nature, and as typically implemented, shares a common radio antenna with Bluetooth network traffic. Likewise, certain aspects of the invention reflect an appreciation that WiFi network traffic is normally given a higher priority, which often results in additional latency and missed packets for connected Bluetooth devices. As a result, latency-sensitive applications such as videoconferencing, collaboration, distance learning, and telemedicine may be adversely affected. Furthermore, certain aspects of the invention reflect an appreciation that even having a separate antenna for Bluetooth network traffic fails to completely resolve this issue as WiFi and Bluetooth share the same frequency band, resulting in interference between their respective packets, not to mention the cost of an additional antenna.

However, certain aspects of the invention likewise reflect an appreciation that the Bluetooth Low Energy (LE) audio protocol not only employs a simpler modulation system than traditional Bluetooth, but it also uses the same 2.4 GHz radio frequencies allows dual-mode user devices to share a single antenna. Likewise, certain aspects of the invention reflect an appreciation that LE audio also supports the ability to configure the interval frequency of Bluetooth network traffic and the number of packets in each interval. Furthermore, certain aspects of the invention reflect an appreciation that certain WiFi network traffic data can be used to enable a Bluetooth isochronous channel for efficient transmission and receipt of LE audio, voice assistant, and sensor data. Accordingly, certain aspects of the invention reflect an appreciation that the ability to sequence WiFi and Bluetooth packets within the same time domain provides the ability to advantageously structure and enable an optimized and efficient utilization of a shared WiFi and Bluetooth antenna.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an intelligent connectivity system 118. In one embodiment, the information handling system 100 is able to download the intelligent connectivity system 118 from the service provider server 142. In another embodiment, the intelligent connectivity system 118 is provided as a service from the service provider server 142.

In certain embodiments, the intelligent connectivity system 118 may be implemented to include a traffic component 120, a persistence component 122, a context component 124, a security component 126, and a management component 128, or a combination thereof, as described in greater detail herein. In certain embodiments, the intelligent connectivity system 118 may be implemented to perform an intelligent connectivity operation, described in greater detail herein. In certain embodiments, the intelligent connectivity operation may be performed by the intelligent connectivity system 118 during operation of an information handling system 100. In certain embodiments, the performance of the intelligent connectivity operation may result in the realization of improved network connectivity for the information handling system 100.

Figure 2:
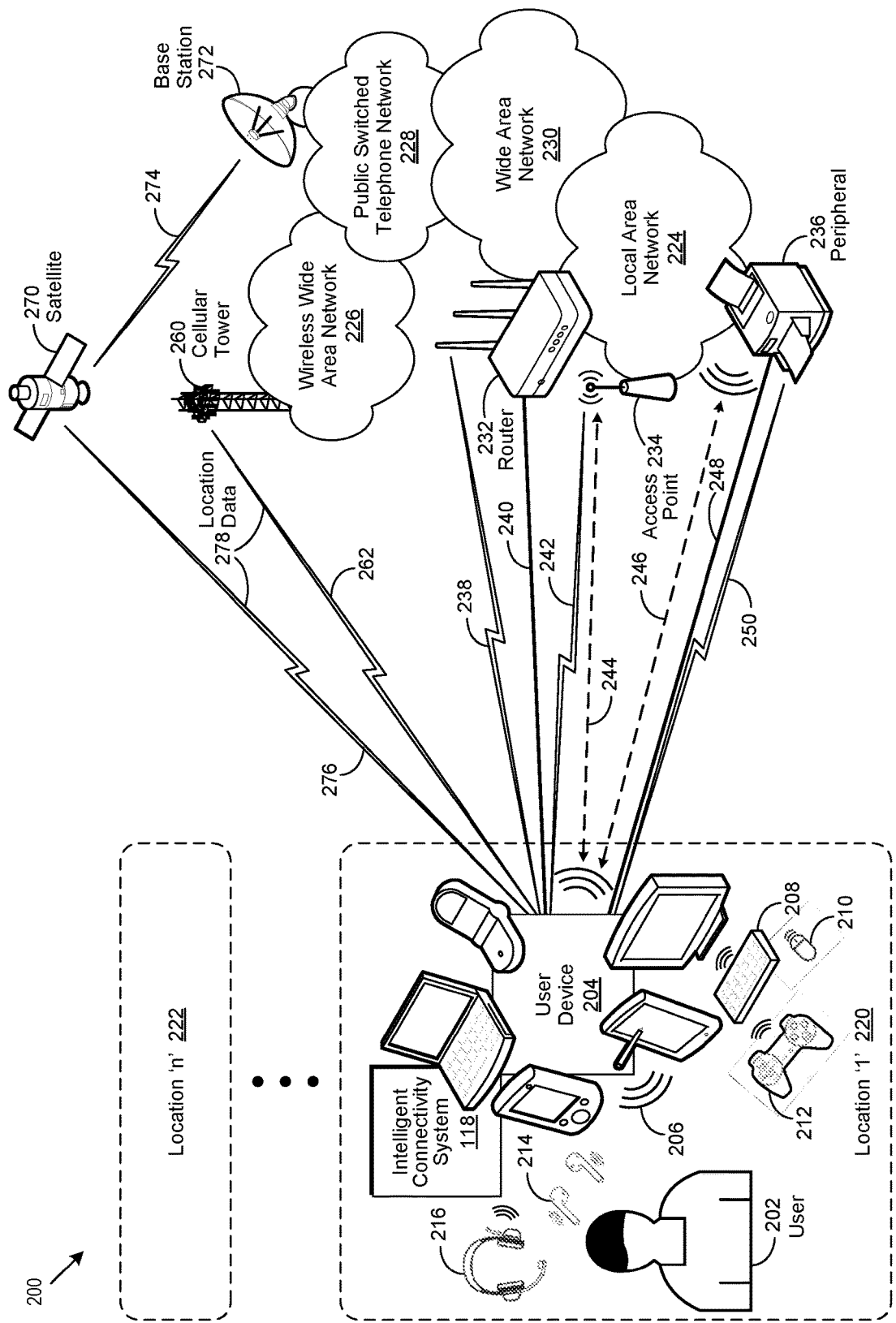
FIG. 2 is a block diagram of an intelligent connectivity environment.

FIG. 2 is a block diagram of an intelligent connectivity environment implemented in accordance with an embodiment of the invention. In certain embodiments, the intelligent connectivity environment 200 may include an intelligent connectivity system 118, described in greater detail herein. In certain embodiments, the intelligent connectivity system 118 may be implemented on a user device 204. As used herein, a user device 204 broadly refers to an information handling system such as a personal computer, a laptop computer, a tablet computer, a personal digital assistant (PDA), a smart phone, a mobile telephone, or other device that is capable of communicating and processing data. In certain embodiments, a user 202 may use the user device 204 to interact with the intelligent connectivity system 118.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204 is physically connected to.

In certain embodiments, the user device 204 may be implemented with communication hardware and software that allows it to communicate with one or more access points 234 via a PAN 244 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a stand-alone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Position System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the intelligent connectivity system 118 may be implemented to establish a particular network link 206, 238, 240, 242, 244, 246, 248, 250, 262, 276 as the user device 204 moves from location '1' 220 to location 'n' 222. In certain of these embodiments, the establishment of a particular network link 206, 238, 240, 242, 244, 246, 248, 250, 262, 276 may be based upon the availability of connectivity to a corresponding network. In various embodiments, the intelligent connectivity system 118 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the intelligent connectivity system 118 may be implemented to switch from one network link 206, 238, 240, 242, 244, 246, 248, 250, 262, 276 to another according to the user device 204 being present at a particular location '1' 220 through 'n' 222. In various embodiments, the intelligent connectivity system 118 may be implemented to establish two or more simultaneous network links 206, 238, 240, 242, 244, 246, 248, 250, 262, 276. In certain of these embodiments, bandwidth respectively corresponding to the two or more network links 206, 238, 240, 242, 244, 246, 248, 250, 262, 276 may be combined to provide aggregated network link bandwidth for use by the user device.

In various embodiments, the intelligent connectivity system 118 may be implemented to assign network connectivity corresponding to a particular software application, or a user device 204 process, to a particular network link 206, 238, 240, 242, 244, 246, 248, 250, 262, 276. In certain embodiments, the intelligent connectivity system 118 may be implemented to respectively assign two or more software applications, or user device 204 processes, to two or more network links 206, 238, 240, 242, 244, 246, 248, 250, 262, 276, according to their corresponding attributes. For example, the intelligent connectivity system 118 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276 may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the intelligent connectivity system 118 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the intelligent connectivity system 118 may be implemented to establish and manage one or more virtual private network (VPN) connections on one or more corresponding network links. Skilled practitioners of the art will be familiar with a VPN, which as typically implemented, uses known tunneling protocols to extend a private network, such as a private LAN 224, across a public WAN 230, such as the Internet, to enable users 202 to use their user devices 204 to send and receive data as to and from an external resource, such as a remote server, as if it was directly connected to the private network. Certain embodiments of the invention reflect an appreciation that a single VPN may not always be sufficient for a particular operational mode, described in greater detail herein.

Accordingly, in certain embodiments, the intelligent connectivity system 118 may likewise be implemented to perform a multi-link network traffic routing operation. As used herein, a multi-link traffic routing operation broadly refers to any operation performed to route network traffic across two or more network links, as described in greater detail herein. In various embodiments, as described in greater detail herein, a multi-link traffic operation may be performed to perform a many-to-many mapping of a plurality of VPN connection to a corresponding plurality of network links. In certain of these embodiments, the many-to-many mapping may be optimized for a particular multi-link configuration. As used herein, as it relates to a many-to-many mapping of a plurality of VPN connection to a corresponding plurality of network links, optimized broadly refers to using certain network link attributes (e.g., available bandwidth, congestion, latency, signal strength, supported protocols, etc.) to determine which network link is best suited for the assignment of a particular VPN.

In certain embodiments, multi-link traffic operations are begun by identifying simultaneously operating VPNs. In various embodiments, the intelligent connectivity system 118 may be implemented to perform certain operations to identify such simultaneously operating VPNs. The configuration policy respectively associated with each identified VPN is then determined. In various embodiments, the configuration policy may be implemented to contain certain information associated with the type of network link supported, the type of traffic that may be routed by each, and so forth, for each VPN.

A network filter driver (NFD), described in greater detail herein, is then used to create n+1 first-in, first-out (FIFO) network traffic queues, where 'n' is defined as the number of previously identified VPNs. Thereafter, a network tunnel indication is created for each identified VPN when it is initiated. In certain embodiments, the network tunnel indication may be implemented as a network tunnel pointer, familiar to those of skill in the art. As an example, network tunnel pointers '1' and '2' may be respectively generated for VPNs '1' and '2.'

Thereafter, each VPN's associated configuration policy is communicated to the NFD. In certain embodiments, the VPN's associated configuration policy may be implemented to define which networks do not require the use of a VPN. In certain embodiments, the VPN's associated configuration policy may be implemented to define which type of network link (e.g., WLAN, WWAN 226, etc.) is supported for the VPN. In certain embodiments, the configuration policy may be implemented to define what kind of network traffic is allowed to be routed to which VPN. In certain embodiments each VPN's associated configuration policy may be implemented to create a list of available VPNs and their associated available network links. Those of skill in the art will recognize that many such embodiments of the use of such a configuration policy are possible. Accordingly, the foregoing is not intended to limit the spirit, scope, or intent of the invention.

Thereafter, a request from the user device's 204 operating system (OS) may be received by the intelligent connectivity system 118 to assign, or reassign, existing network traffic queues to the previously-identified VPNs. To continue the prior example, network traffic queue '1'→network tunnel '1', network traffic queue '2'→network tunnel '1', and network traffic queue '3'→no network tunnel for non-VPN network traffic. If such a request is received, a determination is then made whether a new network traffic queue is needed. If so, then a new network traffic queue is generated and mapped to an associated network tunnel. Thereafter, or if it was previously determined that a new network traffic queue was not needed, then each available network traffic queue is mapped to an available network link, followed by the establishment of a corresponding new VPN.

Figure 3:
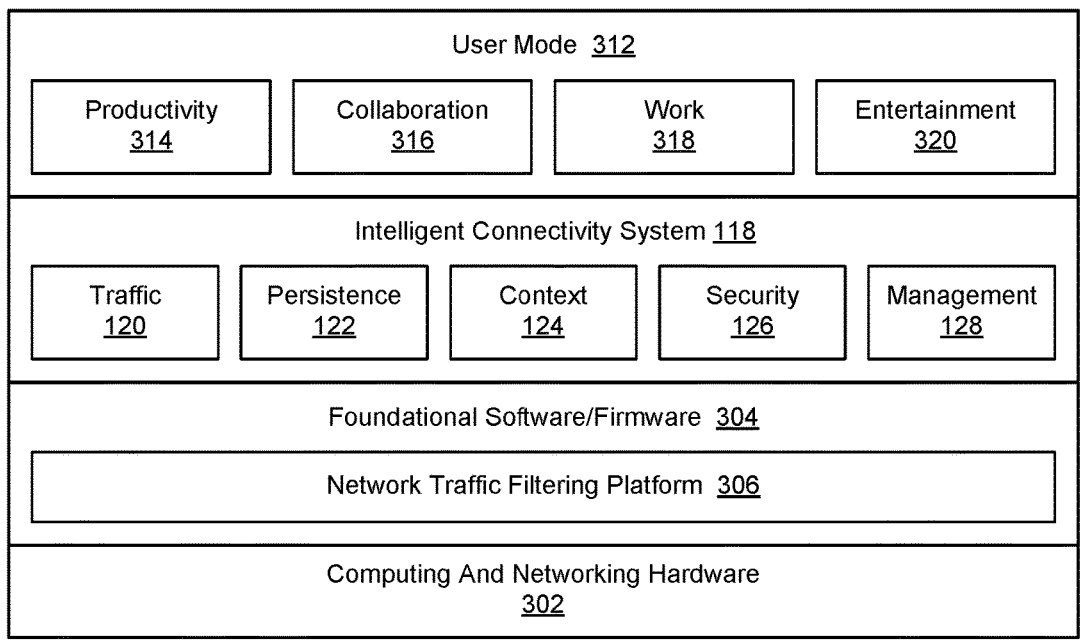
FIG. 3 shows a simplified block diagram of an intelligent connectivity framework.

FIG. 3 shows a simplified block diagram of an intelligent connectivity framework implemented in accordance with an embodiment of the invention. In various embodiments, the intelligent connectivity framework 300 may be implemented to include certain computing and communication hardware 302, certain foundational software and firmware 304, an intelligent connectivity system 118, and one or more operational modes 312, or a combination thereof. In certain embodiments, the computing and communications hardware 302, and the foundational software and firmware 304, or a combination thereof, may be implemented on a user device, described in greater detail herein.

In various embodiments, certain foundational software and firmware 304 may be implemented with certain computing and communication hardware 302, as described in greater detail herein, to detect the availability of connectivity to a particular network. In various embodiments, certain foundational software and firmware 304 may likewise be implemented with certain computing and communication hardware 302 to establish a network link to a detected network, as likewise described in greater detail herein, to communicate information. In certain embodiments, the information may be communicated over one or more virtual private network (VPN) connections. In certain embodiments, the foundational software and firmware 304 may be implemented to include a network traffic filtering platform 306. In certain embodiments, the network traffic filtering platform 306 may be implemented as a Windows® kernel mode filter driver.

In certain embodiments, the intelligent connectivity system 118 may be implemented to perform an intelligent connectivity operation. As used herein, an intelligent connectivity operation broadly refers to any operation whose performance improves a user device's ability to utilize, as described in greater detail herein, network connectivity that may be available for provision by one or more networks. In various embodiments, the intelligent connectivity system 118 may be implemented to use certain computing and communication hardware 302 and certain foundational software and firmware 304, individually or in combination, to perform a particular intelligent connectivity operation.

In certain embodiments, the intelligent connectivity system 118 may be implemented to include a traffic component 120, a persistence component 122, a context component 124, a security component 126, and a management component 128, or a combination thereof. In certain embodiments, the traffic component 120, persistence component 122, context component 124, security component 126, or management component 128 may be implemented, individually or in combination, to perform a particular intelligent connectivity operation. In certain embodiments, the traffic component 120 may be implemented to determine whether one or more networks are available to provide network connectivity to the information handling system 100. In certain embodiments, the traffic component 120 may be implemented to use the one or more networks, individually or in combination, to provide network connectivity to a user device.

In certain embodiments, the persistence component 122 may be implemented to use two or more networks, individually or in combination, to provide network connectivity continuity to a user device. In certain embodiments, the context component 124 may be implemented to select one or more networks to provide network connectivity to a user device based upon the context in which the user device is being used. In certain embodiments, the security component 126 may be implemented to select one or more networks to provide secure network connectivity to a user device. In various embodiments, the management component 128 may be implemented to manage certain aspects of network connectivity provided by one or more networks to a user device.

In various embodiments, the intelligent connectivity system 118 may be implemented to provide certain network connectivity, at a particular time, or location, or both, to a user device according to its current operational mode 312. As used herein, an operational mode 312 of a user device broadly refers to the purpose it may be used for. In certain embodiments, the operational mode 312 of a user device may be associated with the use of a particular user device for productivity 314, collaboration 316, work 318, or entertainment 320, or a combination thereof.

As used herein, and as it relates to an operational mode 312, productivity 314 broadly refers to the ratio of output volume to input volume. For example, a consultant for a construction company may need to estimate the cost of a project while at a client's jobsite. In this example, the consultant may enter certain information related to the project, such as the amount and cost of certain materials and anticipated labor costs, into a project estimation application running on a mobile user device. To continue the example, the estimator may achieve a certain level of productivity 314 by simply using the project estimation application to generate an initial estimate.

However, the consultant may achieve a greater level of productivity 314 if the user device is able to use available network connectivity to establish two virtual private network (VPN) connections, one to the consultant's resources and another to the client's resources. If so, then the consultant can use the first VPN connection to securely access past estimates for similar projects, which in turn can be used to prepare a final estimate for the client. Once the final estimate is completed, the second VPN connection can be used to present it to the client.

As used herein, and as it relates to an operational mode 312, collaboration 316 broadly refers to the action of interacting with someone to achieve a common purpose. Skilled practitioners of the art will recognize that many examples of such a common purpose are possible. As an example, the common purpose may be for a group of individuals with a common interest to use their respective user devices to participate in a videoconference to produce or create something. As another example, the common purpose may be for a group of friends to use their respective user devices to meet via videoconference on a regular basis to maintain their relationship.

As used herein, and as it relates to an operational mode 312, work 318 broadly refers to an exertion or effort to produce or accomplish something. Those of skill in the art will be aware that work may take many forms. As an example, an exterminator may be paid by the job. In this example, the exterminator may stop in a coffee shop, access their public WiFi network, and establish a VPN connection to his office. Once connected, the exterminator may securely download his assignments for the day. Then, one by one, he continues on to each location and completes his assignment. To continue the example, after completion of each assignment the exterminator may then complete a report. Once it is complete, the exterminator may then access a cellular network, establish a VPN connection, and then securely upload each report to his office.

Certain embodiments of the invention reflect an appreciation that not all work 318 is performed for monetary reward. For example, some work 318 may be performed for educational purposes. To illustrate this example, a student may use a mobile user device, no matter where they may be, to access knowledge resources through a network connection, use those resources to complete an assignment, and then submit it using the same, or a different, network connection.

As another example, some work 318 may be performed for altruistic reasons. To illustrate this example, a member of a non-profit organization may volunteer to check on the wellbeing of elderly residents. In this example, the volunteer may use the WiFi connection in her home to establish a VPN connection with the non-profit. Once the VPN connection is established, she downloads the list of residents, and their addresses, she is scheduled to visit that day to her tablet computer. She then uses the tablet computer throughout the morning to note the status of each resident. The volunteer then stops at a restaurant for lunch. Once she has ordered, she accesses the WiFi network connection in the restaurant, establishes a VPN connection with the non-profit, and uploads a report summarizing the results of her morning's work.

As used herein, and as it relates to an operational mode 312, entertainment 320 broadly refers to the action of providing, or being provided, with amusement or enjoyment. Skilled practitioners of the art will recognize that entertainment may take many forms. As an example, a user may use a mobile device to wirelessly connect to a Local Area Network (LAN) in their home. Once the connection is established, the user may access a streaming movie service. Once the streaming movie service is accessed, and a movie selected, the user may then use a Bluetooth connection to wirelessly connect a pair of earphones to their mobile device. Once connected, the user can then view the movie on the mobile device as they listen to the movie's soundtrack on their wireless headphones.

As another example, a user may use a gaming computer to play an online, multi-user game. In this example, the user may use a wired connection to the LAN in their home for the gaming computer and a cellular network connection for their mobile phone. To continue the example, the gaming computer may use the wired connection to the LAN to ensure that whatever bandwidth is available on the LAN is dedicated to the online game itself. Likewise, the user may use the mobile phone's connection to the cellular network to carry on a conversation with other players of the online game.

Certain embodiments of the invention reflect that it is possible that a particular operational mode 312 may be associated with the simultaneous use of a particular user device for productivity 314, collaboration 316, work 318, or entertainment 320, or a combination thereof. As an example, a game developer may use a user device, in combination with one or more network connections, while developing a game. In this example, the developer may use the user device, and the one or more network connections to improve their productivity 314, collaborate 316 with co-workers, work 318 on various aspects of the game, all the while being entertained 320 by the game itself. Those of skill in the art will recognize that many such examples of an operational mode 312 are possible. Accordingly, the foregoing is not intended to limit the spirit, scope, or intent of the invention.

Figure 4:
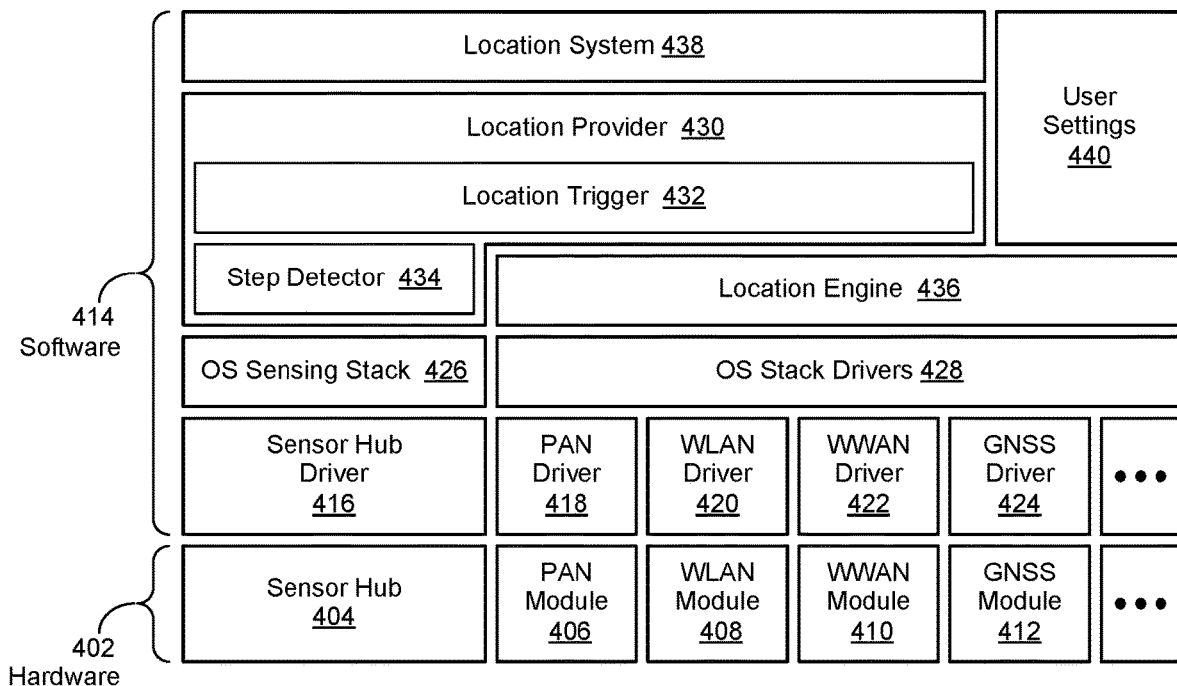
FIG. 4 shows hardware and software components used in the performance of a Bluetooth network connectivity persistence operation.

FIG. 4 shows hardware and software components used in the performance of a Bluetooth network connectivity persistence operation implemented in accordance with an embodiment of the invention. In various embodiments, a user device may be implemented with certain hardware 402 and software 414 components that it may use to determine its location and the location of certain network links, described in greater detail herein. In certain embodiments, the hardware components 402 may include a location sensor hub 404 module, a Personal Area Network (PAN) 406 module, a Wireless Local Area Network (WLAN) 408 module, a Wireless Wide Area Network (WWAN) 410 module, a Global Navigation Satellite System (GNSS) 412 module, and so forth.

As used herein, a sensor hub 404 module broadly refers to a hardware module configured to integrate sensor data from different sensors and process them. In certain embodiments, the sensor hub 404 module may be implemented to off-load sensor-related operations and processes from a user device's primary central processing unit (CPU) to reduce battery consumption and provide associated performance improvements. One known example of a sensor hub 404 module is the INTEL® Integrated Sensor Hub (ISH).

In certain embodiments, the PAN 406 module may be implemented to communicate data through a network link to an associated PAN, described in greater detail herein. In certain embodiments, the WLAN 408 module may be implemented to communicate data through a network link to an associated WLAN, likewise described in greater detail herein. Likewise, as described in greater detail herein, the WWAN 410 module may be implemented in certain embodiments to communicate data through a network link to an associated WWAN. In various embodiments, as likewise described in greater detail herein, the GNSS 412 module may be implemented to receive certain Global Position System (GPS) data from a GPS satellite.

In certain embodiments, the software components 414 may include a sensor hub 416 driver, a PAN 418 driver, a WLAN 420 driver, a WWAN 422 driver, a GNSS 424 driver and so forth. In certain embodiments, the sensor hub 416, PAN 418, WLAN 420, WWAN 422, and GNSS 424 drivers may be implemented to respectively provide a programming interface to control and manage the sensor hub 404, PAN 406, WLAN 408, WWAN 410, and GNSS 412 modules. In certain embodiments, the software components 414 may likewise include an operating system (OS) sensing stack 426 and OS stack drivers 428 familiar to skilled practitioners of the art.

Likewise, in certain embodiments, the software components 414 may include a location engine 436. In certain embodiments, the location engine 436 may be implemented to perform a location determination operation. As used herein, a location determination operation broadly refers to any operation performed to determine the location of a user device, and the location of an available network, and the distance between the two.

In certain embodiments, the software components 414 may likewise include a location provider 430 module. In certain embodiments, the location provider 430 module may be implemented to include a location trigger 432 sub-module, or a step detector 434 sub-module, or both. In various embodiments, the location trigger 432 sub-module may be implemented to perform a geofencing operation. As used herein, a geofencing operation broadly refers to any operation performed to establish a virtual perimeter, commonly referred to as a geo-fence, for a corresponding real-world geographic area.

In certain embodiments, a geo-fence may be dynamically generated, such as a radius around a particular geographic point. In certain embodiments, a geo-fence may be generated as a set of predefined geographic boundaries. In certain embodiments, the location trigger 432 sub-module may be implemented to generate an alert when an associated user device approaches the boundaries of a particular geo-fence. In certain embodiments, the step detector 434 sub-module may be implemented to measure individual steps a user may make in the course of using a particular user device. In various embodiments, the step detector 434 sub-module may be implemented to use certain information provided by a motion sensor, or accelerometer, or both, to make such user step measurements.

In various embodiments, the location trigger 432 sub-module and the step detector 434 sub-module may be implemented, individually or in combination, to provide certain location information they may generate to the location provider 430 module. In various embodiments, the location provider 430 module may be implemented to generate location information for use by software applications executing on a user device. In certain embodiments, the location provider 430 module may be implemented to determine the geographic location of an associated user device by WLAN triangulation, use of location information provided through the use of the IEEE 802.11mc standard, IP address resolution, cellular network tower triangulation, use of Global Position System (GPS) information, or a combination thereof. In various embodiments, the location provider 430 module may be implemented to use certain location information provided by the location trigger 432 and step detector 434 sub-modules to provide location information for use in a location network tag (LNT), described in greater detail herein. One known example of a location provider 430 module is the Windows® Location Provider®, familiar to those of skill in the art.

In certain embodiments, the software components 414 may include a location system 436. In various embodiments, the location system 436 may be implemented to use certain known artificial intelligence (AI) and machine learning (ML) approaches to estimate a particular network link's expected throughput, latency, coverage, signal strength, and other network connectivity metrics. In various embodiments, the location system 436 may be implemented to certain location information provided by the location provider 430, or LNT information it may generate, in the use of such AI and ML approaches.

In certain embodiments, the software components 414 may likewise include a user settings 440 module. In certain embodiments, the user settings 440 module may be implemented to store certain network connectivity settings associated with a user of a user device. Skilled practitioners of the art will recognize that many such embodiments are possible. Accordingly, the foregoing is not intended to limit the spirit, scope, or intent of the invention.

Figure 5A:
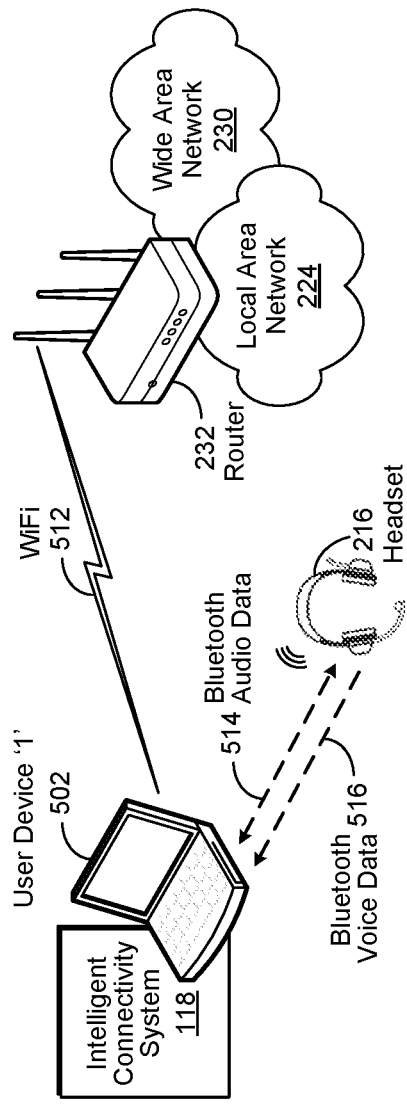
FIGS. 5a through 5d show examples of Bluetooth network traffic being persisted during concurrent use of a Wireless Fidelity (WiFi) network link.

FIGS. 5a through 5d show examples of Bluetooth network traffic being persisted in accordance with an embodiment of the invention during concurrent use of a Wireless Fidelity (WiFi) network link. For example, as shown in FIG. 5a, user device '1' 502 may be implemented in certain embodiments for use in a videoconference. In certain embodiments, user device '1' 502 may likewise be implemented with an intelligent connectivity system 118, described in greater detail herein. Likewise, in certain embodiments, user device '1' 502 may be implemented to use a WiFi 512 network link to connect to a router 232, which in turn provides network access to a Local Area Network (LAN) 224, a Wide Area Network (WAN) 230, or a combination of the two. In certain embodiments, user device '1' 502 may be implemented to connect with a wireless headset 216 via streams of Bluetooth audio data 514, or Bluetooth voice data 516, or a combination of the two. In certain embodiments, the intelligent connectivity system 118 may be implemented, as described in greater detail herein, to improve the persistence of Bluetooth network traffic by reducing interference between WiFi 512, Bluetooth audio data 514, and Bluetooth voice data 516 packets.

Figure 5B:
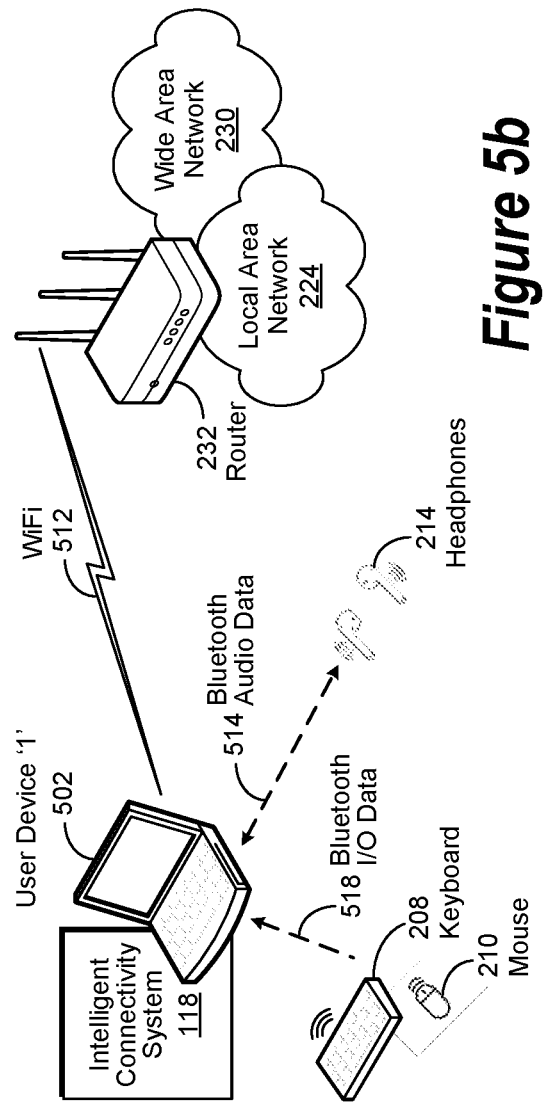

As another example, as shown in FIG. 5b, user device '1' 502 may be implemented in certain embodiments for use in listening to a streaming music service. In certain embodiments, user device '1' 502 may likewise be implemented with an intelligent connectivity system 118. Likewise, in certain embodiments, user device '1' 502 may be implemented to use a WiFi 512 network link to connect to a router 232, which in turn provides network access to a LAN 224, a WAN 230, or a combination of the two. In certain embodiments, user device '1' 502 may be implemented to connect with wireless headphones 214 via streams of Bluetooth audio data 514, and with a wireless keyboard 208 and mouse 210 via streams of Bluetooth input/output (I/O) data 518. In certain embodiments, the intelligent connectivity system 118 may be implemented, as described in greater detail herein, to improve the persistence of Bluetooth network traffic by reducing interference between WiFi 512, Bluetooth audio data 514, and Bluetooth I/O 518 packets.

Figure 5C:
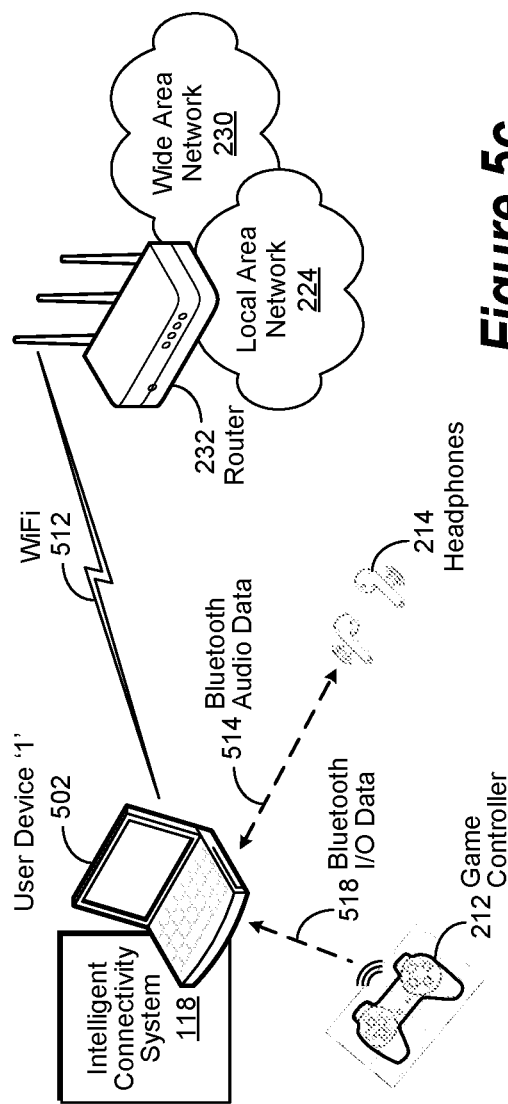

As yet another example, as shown in FIG. 5c, user device '1' 502 may be implemented in certain embodiments for use in online gaming activities. In certain embodiments, user device '1' 502 may likewise be implemented with an intelligent connectivity system 118. Likewise, in certain embodiments, user device '1' 502 may be implemented to use a WiFi 512 network link to connect to a router 232, which in turn provides network access to a LAN 224, a WAN 230, or a combination of the two. In certain embodiments, user device '1' 502 may be implemented to connect with wireless headphones 214 via streams of Bluetooth audio data 514, and with a game controller 212 via streams of Bluetooth input/output (I/O) data 518. In certain embodiments, the intelligent connectivity system 118 may be implemented, as described in greater detail herein, to improve the persistence of Bluetooth network traffic by reducing interference between WiFi 512, Bluetooth audio data 514, and Bluetooth I/O 518 packets.

Figure 5D:
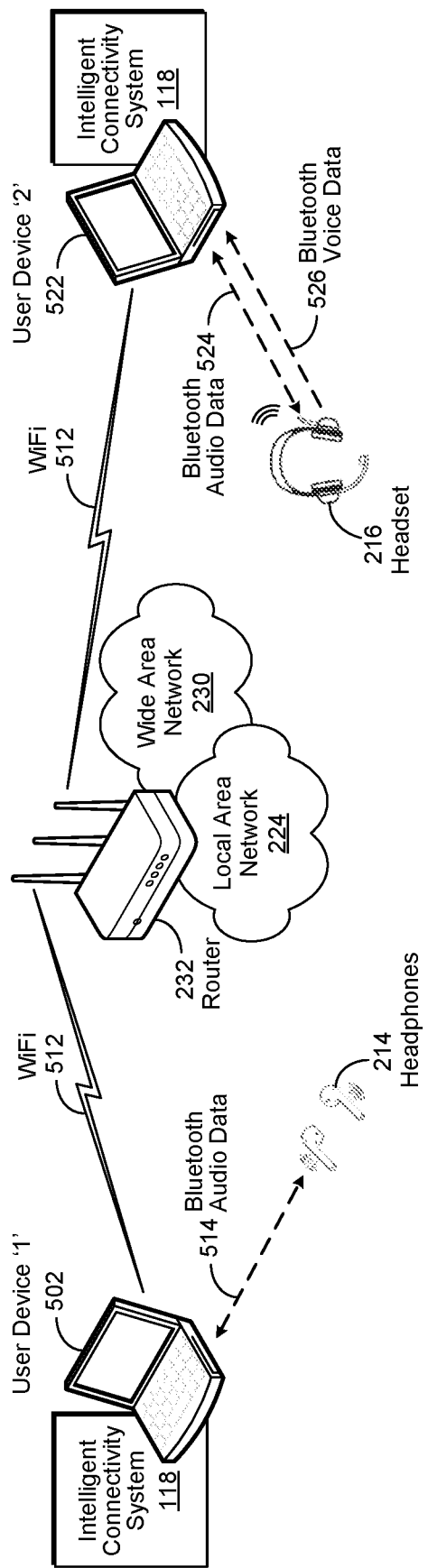

As yet still another example, as shown in FIG. 5d, user devices '1' 502 and '2' 522 may be implemented in certain embodiments for use in online education activities. In certain embodiments, user devices '1' 502 and '2' 522 may likewise be respectively implemented with an intelligent connectivity system 118. Likewise, in certain embodiments, user devices '1' 502 and '2' 522 may respectively be implemented to use a WiFi 512 network link to connect to a router 232, which in turn provides network access to a LAN 224, a WAN 230, or a combination of the two. In certain embodiments, user device '1' 502 may be implemented to connect with wireless headphones 214 via streams of Bluetooth audio data 514. Likewise, user device '2' 522 may be implemented to connect with a wireless headset 216 via streams of Bluetooth audio data 514, or Bluetooth voice data 516, or a combination of the two.

In certain embodiments, the intelligent connectivity system 118 may be implemented on user device '1' 502 to improve the persistence of Bluetooth network traffic by reducing interference between WiFi 512 and Bluetooth audio data 514 packets. Likewise, in certain embodiments, the intelligent connectivity system 118 may be implemented on user device '2' 522 to improve the persistence of Bluetooth network traffic by reducing interference between WiFi 512, Bluetooth audio data 524, and Bluetooth I/O voice data 526 packets. Those of skill in the art will recognize that many such examples and embodiments are possible. Accordingly, the foregoing is not intended to limit the spirit, scope, or intent of the invention.

FIGS. 6a and 6b show packet timing and sequencing arbitration operations implemented in accordance with an embodiment of the invention to reduce instances of packet collision in concurrent streams of Wireless Fidelity (WiFi) and Bluetooth network traffic. Various embodiments of the invention reflect an appreciation that Bluetooth network links, as currently implemented, share the same 2.4 GHz frequency commonly used by certain WiFi network links. Certain embodiments of the invention likewise reflect an appreciation, as shown in FIG. 6a, that concurrent streams of WiFi 602 and Bluetooth 604 packets may result in one or more packet collisions 626 over time 606.

In certain embodiments, as described in greater detail herein, a WiFi network link may be established to communicate a stream of WiFi packets 602, such as WiFi packets '1' 608, '2' 610, '3' 612, and so forth. In certain embodiments, the stream of WiFi packets 602 may be implemented to have an associated wait indicator, which defines an interval of time between individual WiFi packet wake sessions. As used herein, a WiFi packet wake session broadly refers to an interval of time during which a particular WiFi packet (e.g., WiFi packets '1' 608, '2' 610, '3' 612, and so forth) communicates data.

In certain embodiments, the wait indicator may be implemented as a Target Wait Time (TWT) 614, which is defined in the IEEE 802.11ax WiFi specification. Skilled practitioner of the art will be aware that a TWT 614, as typically implemented, enables WiFi-enabled devices to determine when, and how frequently, they wake up to send and receive data. Those of skill in the art will likewise be aware that TWTs are often implemented to conserve battery life by increasing device sleep time. However, they can also be advantageously implemented to enable wireless access points to negotiate and define certain time intervals for a particular device to communicate data over a WiFi network link, thereby reducing contention and overlap between WiFi-enabled devices.

In certain embodiments, as described in greater detail herein, a Bluetooth network link may be established to communicate a stream of Bluetooth packets 604. In certain embodiments, the stream of Bluetooth packets 604 may be communicated during an Asynchronous Connection-Less Logical (ACL) 630 transport interval 616 (e.g., 60 ms). Skilled practitioners of the art will be familiar with ACL 630, which is a communications protocol used for communicating data over a Bluetooth network link.

As commonly implemented, ACL 630 can carry several types of packet, distinguished by their length (e.g., 1, 3, or 5 time slots), which is dependent upon the size of the data payload. The ACL 630 protocol also provides forward error correction, which may reduce the rate at which data is communicated in favor of reliability. Those of skill in the art will likewise be aware that ACL 630 packets are automatically retransmitted if not acknowledged, allowing for correction of a Bluetooth network link that is subject to interference.

In certain embodiments, an ACL 630 transport interval 616 may be implemented to include two or more Isochronous Connection-Oriented (ICO) intervals 618. For example, as shown in FIG. 6a, the ACL 630 transport interval 616, which has a duration of 60 ms, may be made up of six, sequential ICO intervals 618, each with a duration of 10 ms. As likewise shown in FIG. 6a, each ICO interval 618 may be implemented to include a single primary event 620, which is a slot for an ICO packet 626, and a single secondary sub-event 624, which is a slot for retransmission 628 of the ICO packet 628 should it be corrupted during transmission. Likewise, as shown in FIG. 6a, corruption of a particular ICO packet 626 may occur as a result of a packet collision 632 with a particular WiFi packet 602.

Referring now to FIG. 6b, in various embodiments, a particular wait indicator (e.g., TWT 614), and one or more associated WiFi packet wake sessions (e.g., WiFi packets '1' 608, '2' 610, '3' 612, and so forth) may be used to configure a stream of WiFi packets 602 corresponding to a WiFi network link, or channel. In certain of these embodiments, a stream of Bluetooth packets 604 may be configured such that they are interleaved with the stream of WiFi packets 602 such that no packet collisions 632 occur. As an example, a 60 ms ACL 630 transport interval 616 may be implemented to include two 30 ms ICO intervals 634.

In this example, each of the two 30 ms ICO intervals 634 has been configured to accommodate a burst number of Bluetooth packets (e.g. five). In this example, the each 30 ms ICO interval 634 is configured to includes a single primary event 636, which is a slot for an ICO packet 626, and four secondary events 638, which includes slots for two additional ICO packets 626 and two slots for retransmission 628 of any of the three ICO packet 628 should they be corrupted during transmission. As shown in FIG. 6b, the primary event 636 and the secondary sub-events 638 are timed such that they respectively occur within a corresponding TWT 614 wake interval. Accordingly, the possibility of an associated packet collision 632 occurring is reduced. In various embodiments, certain capabilities outlined in the Bluetooth Low Energy (LE) specification may be utilized to configure a particular ACL 630 transport interval 616, a particular ICO interval 634, a corresponding burst number of Bluetooth packets, and their associated primary events 636 and secondary sub-events 638.

In various embodiments, certain contextual information corresponding to one or more user devices, or associated peripherals, or a combination thereof, described in greater detail herein, may be used to arbitrate a WiFi band change for a duration of a user device session. As used herein, a user device session broadly refers to an interval of time during which a user device may be used by a user for a particular user device context, described in greater detail herein. In various embodiments, the contextual information may include information related to certain quality metrics for a WiFi or Bluetooth network link. In certain embodiments, the duration of a particular user device session may be based upon the power state (e.g., estimated remaining battery charge) of the user device. In certain embodiments, the contextual information may be used to determine the percentage of network traffic, or type of network traffic, or the ratio of such network traffic, that may be assigned to a particular WiFi or Bluetooth network link.

In certain embodiments, the contextual information may be used to arbitrate TWT 614 duration and the size of particular WiFi packets 602 (e.g., WiFi packets '1' 608, '2' 610, '3' 612, and so forth). In certain embodiments, the contextual information may be used to arbitrate a request for certain WiFi network traffic to be assigned to either the 5 GHz or 6 GHz band, while assigning all Bluetooth network traffic to the 2.4 GHz band. Skilled practitioners of the art will recognize that many such embodiments and examples are possible. Accordingly, the foregoing is not intended to limit the spirit, scope, or intent of the invention.

Figure 7:
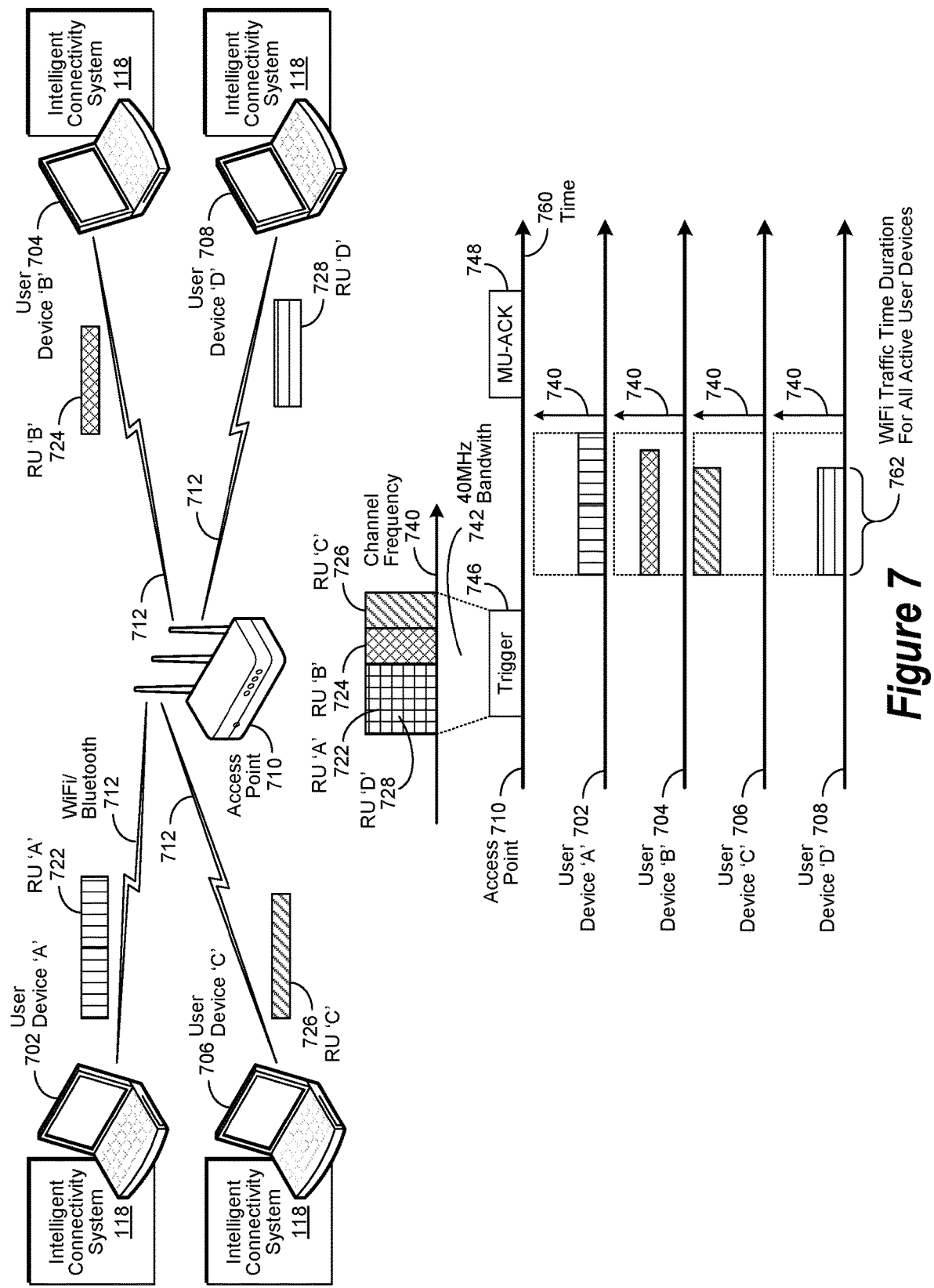
FIG. 7 is a simplified block diagram showing the use of a plurality of resource units (RUs) to arbitrate Target Wait Time (TWT) and WiFi packet size.

FIG. 7 is a simplified block diagram showing the use of a plurality of resource units (RUs) implemented in accordance with an embodiment of the invention to arbitrate Target Wait Time (TWT) and Wireless Fidelity (WiFi) packet size to provide Bluetooth network persistence connectivity for a corresponding plurality of user devices. In various embodiments, a plurality of user devices 'A' 702, 'B' 704, 'C' 726, 'D' 708, and so forth, may respectively be implemented with a corresponding intelligent connectivity system 118. In certain of these embodiments, each of the intelligent connectivity systems 118 may be implemented to respectively establish, and manage, a Wireless Fidelity (WiFi) network link 712 with an access point 710 for user devices 'A' 702, 'B' 704, 'C' 726, 'D' 708, and so forth. In certain embodiments, the access point 710 may be implemented to use a plurality of resource units (RUs) to manage the WiFi link 712 respectively associated with each user device 'A' 702, 'B' 704, 'C' 726, 'D' 708, and so forth.

Skilled practitioners of the art will be familiar with the concept of a resource unit (RU), which in Orthogonal Frequency Division Multiplexing Access (OFDMA) terminology denotes a group of 78.125 kHz bandwidth subcarriers, or tones, used in IEEE 802.11ax Downlink (DL) and Uplink (UL) transmissions. Those of skill in the art will likewise be aware that, as typically implemented, a maximum of nine RUs are allowed for 20 MHz of bandwidth, eighteen RUs for 40 MHz of bandwidth, and so forth for 80 or 160 MHz of bandwidth. In certain embodiments, a 20 MHz WiFi 712 channel may be implemented to support up to 242 RUs, which can be allocated into groups of RUs (e.g., 2×16 RUs, 4×52 RUs, 9×26 RUs, etc.) As likewise typically implemented, the use of RUs allows an access point 710 to be accessed simultaneously and efficiently by a plurality of user devices 'A' 702, 'B' 704, 'C' 726, 'D' 708, and so forth.

For example, as shown in FIG. 7, the access point 710 may be implemented to respectively assign RUs 'A' 722, 'B' 724, 'C' 726, 'D' 728, and so forth, to user device 'A' 702, 'B' 704, 'C' 726, 'D' 708, and so forth. Likewise, the access point 710 may be implemented in certain embodiments to aggregate RUs 'A' 722, 'B' 724, 'C' 726, 'D' 728, and so forth, and once aggregated, assign the aggregated RUs to a particular channel frequency 740 having a certain bandwidth 742 (e.g., 40 MHz). In turn, the aggregated RUs 'A' 722, 'B' 724, 'C' 726, 'D' 728, and so forth, can then be assigned to an access point 710 trigger function 746.

As shown in FIG. 7, each of the RUs 'A' 722, 'B' 724, 'C' 726, 'D' 728, and so forth, respectively associated with user devices 'A' 702, 'B' 704, 'C' 726, 'D' 708, and so forth, are then used concurrently during a particular WiFi traffic time 760 duration 762 for all active user devices. Once the RUs 'A' 722, 'B' 724, 'C' 726, 'D' 728, and so forth, are used during the WiFi traffic time duration 762, a MU-ACK response is returned to the access point 710. Skilled practitioners of the art will recognize many such examples and embodiments are possible. Accordingly, the foregoing is not intended to limit the spirit, scope, or intent of the invention.

Figure 8:
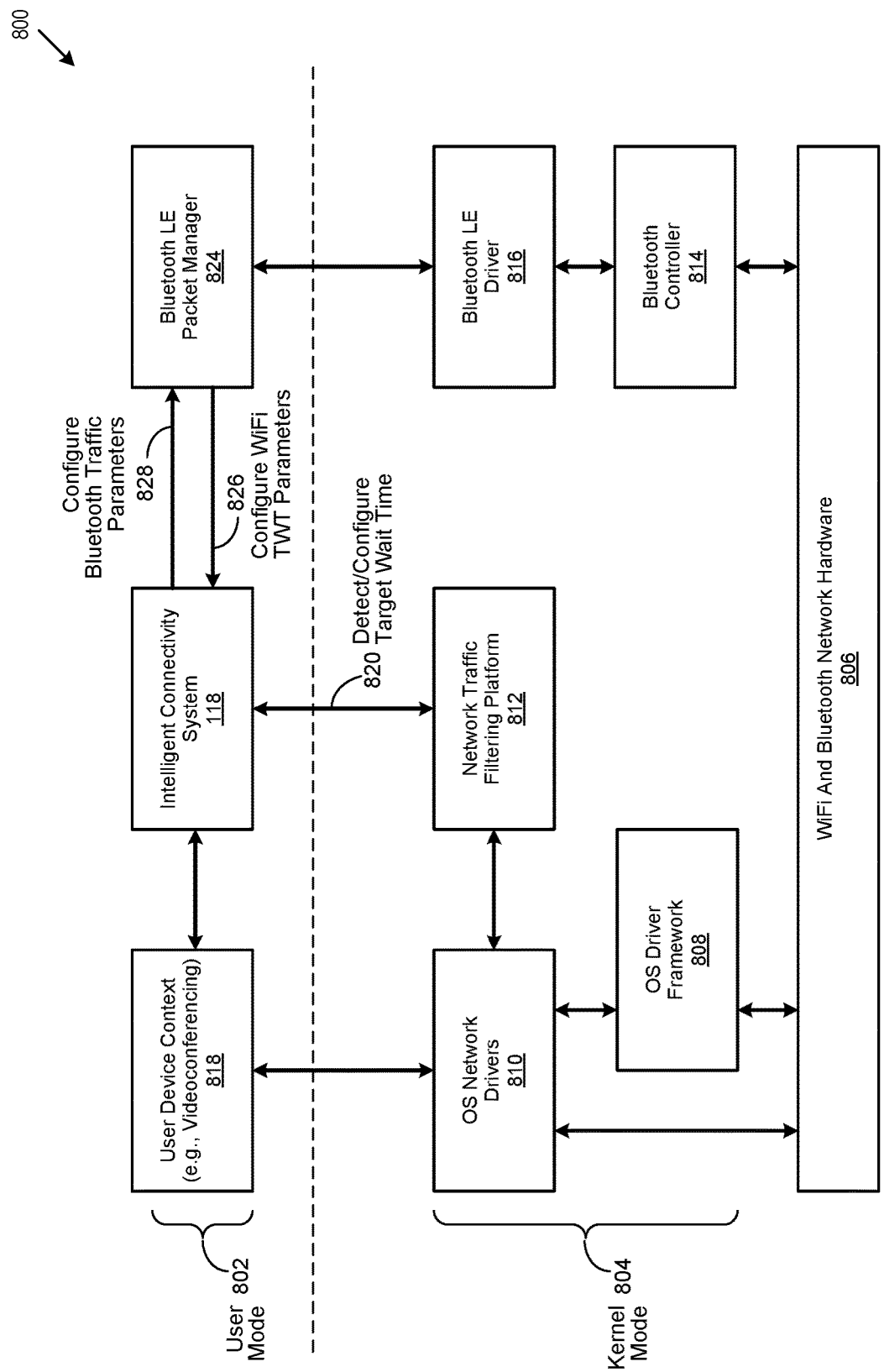
FIG. 8 shows modes of operation and parameter handshakes used in the performance of a Bluetooth network connectivity persistence operation.

FIG. 8 shows modes of operation and parameter handshakes used in the performance of a Bluetooth network connectivity persistence operation implemented in accordance with an embodiment of the invention. In certain embodiments, a Bluetooth network connectivity persistence operation 800 may be implemented to include a user mode 802 of operation and a kernel mode 804 of operation. Skilled practitioners of the art will be familiar with a user mode 802 of operation, which refers to when the operating system (OS) of an information handling system (IHS) is running a user application such as a word processor, spreadsheet, web browser, and so forth. Those of skill in the art will likewise be aware that core OS components run in kernel mode 804. Likewise, drivers typically run in kernel mode 804, although some may be implemented to run in user mode 802.

In certain embodiments, the transition from user mode 802 to kernel mode 804 may occur when a user device context 818, such as a videoconferencing application, invokes one or more operating system (OS) drivers 810 for use by the user device context 818. In various embodiments, as described in greater detail herein, an intelligent connectivity system 118 may be implemented on an associated user device in combination with a particular device context 818. In certain of these embodiments, as likewise described in greater detail herein, the intelligent connectivity system 118 may be implemented to detect and configure Target Wait Time (TWT) parameters of a particular Wireless Fidelity (WiFi) link for use by the user device. In certain embodiments, the intelligent connectivity system 118 may be implemented to provide the resulting TWT parameters to a network filtering platform 812, described in greater detail herein.

In various embodiments, the TWT parameters may then be used by the network traffic filtering platform 812 to configure certain OS network drivers 810. In certain embodiments, the network traffic filtering platform 306 may be implemented as a Windows® Filtering Platform. Likewise, the OS network driver 426 may be implemented in certain embodiments in the form of various Windows® Driver Model (WDM) drivers.

In certain embodiments, the configured OS network drivers 810 may in turn may be provided to certain WiFi and Bluetooth network hardware 806. In certain embodiments, the configured OS network drivers may instead be provided to an OS driver framework 808, familiar to skilled practitioners of the art, which manages their provision to the WiFi and Bluetooth network hardware 806. In various embodiments, certain of the configured OS network drivers may be used by certain WiFi hardware 806 to establish and configure a WiFi network link. In various embodiments, the configured OS network drivers may be used by certain Bluetooth hardware 806 to provide certain WiFi network link configuration information to a Bluetooth controller 814, where it is used in combination with a Bluetooth LE driver 816, to establish a corresponding Bluetooth LE network link.

In various embodiments, a Bluetooth LE packet manager 824, likewise familiar to those of skill in the art, may be implemented to interact with the intelligent connectivity system 118 to configure 826 certain TWT parameters of the previously established WiFi network link, as described in greater detail herein. In various embodiments, the Bluetooth LE packet manager 824 may likewise be implemented to interact with the intelligent connectivity system 118 to configure 828 certain parameters of the previously established Bluetooth network link. In certain embodiments, the configuration 828 of the previously established Bluetooth network link may include configuring the timing of certain isochronous (ISO) channels of the Bluetooth network link.

Figure 9A:
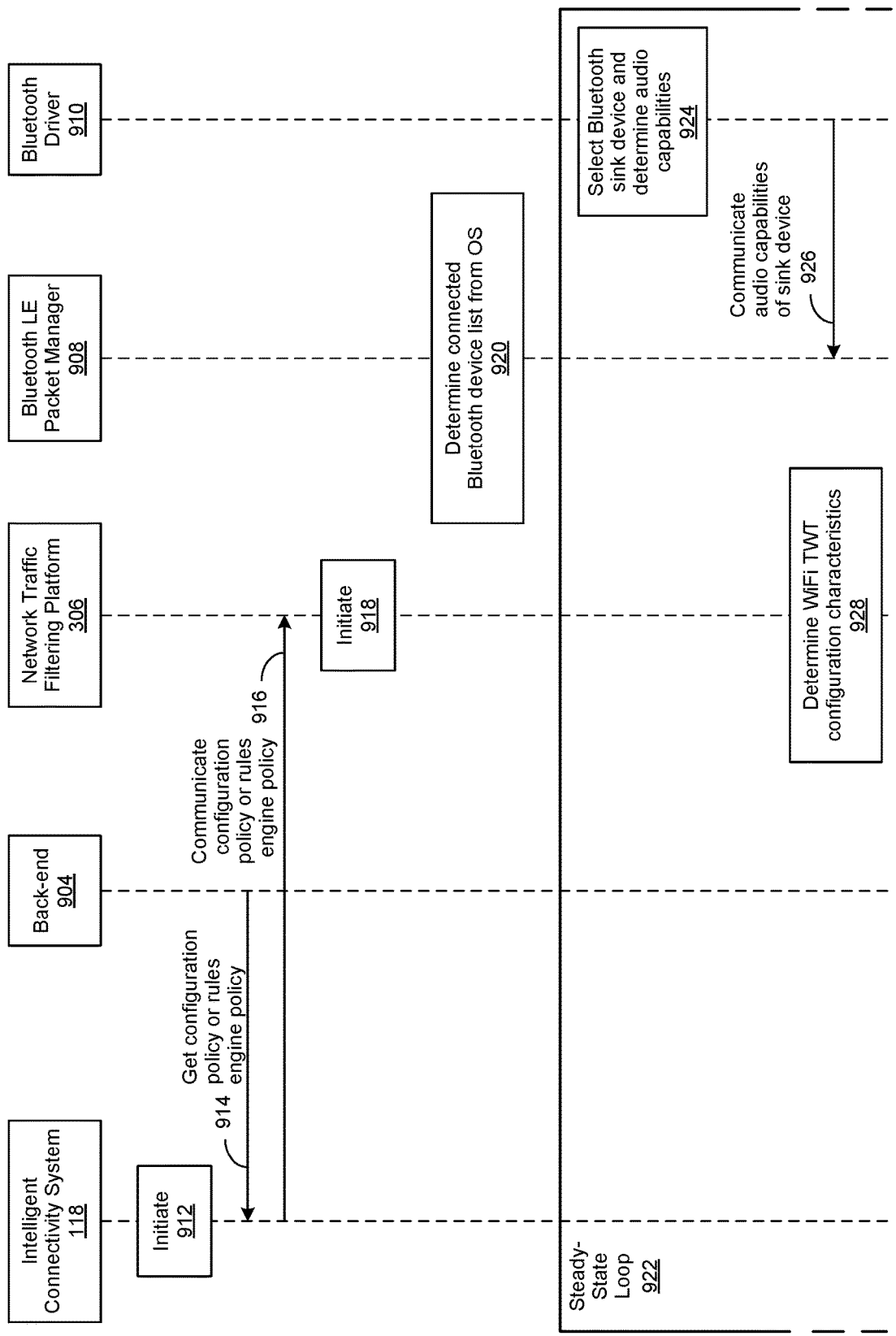
FIGS. 9a and 9b show process flows associated with the performance of Bluetooth network connectivity persistence operations.
Figure 9B:
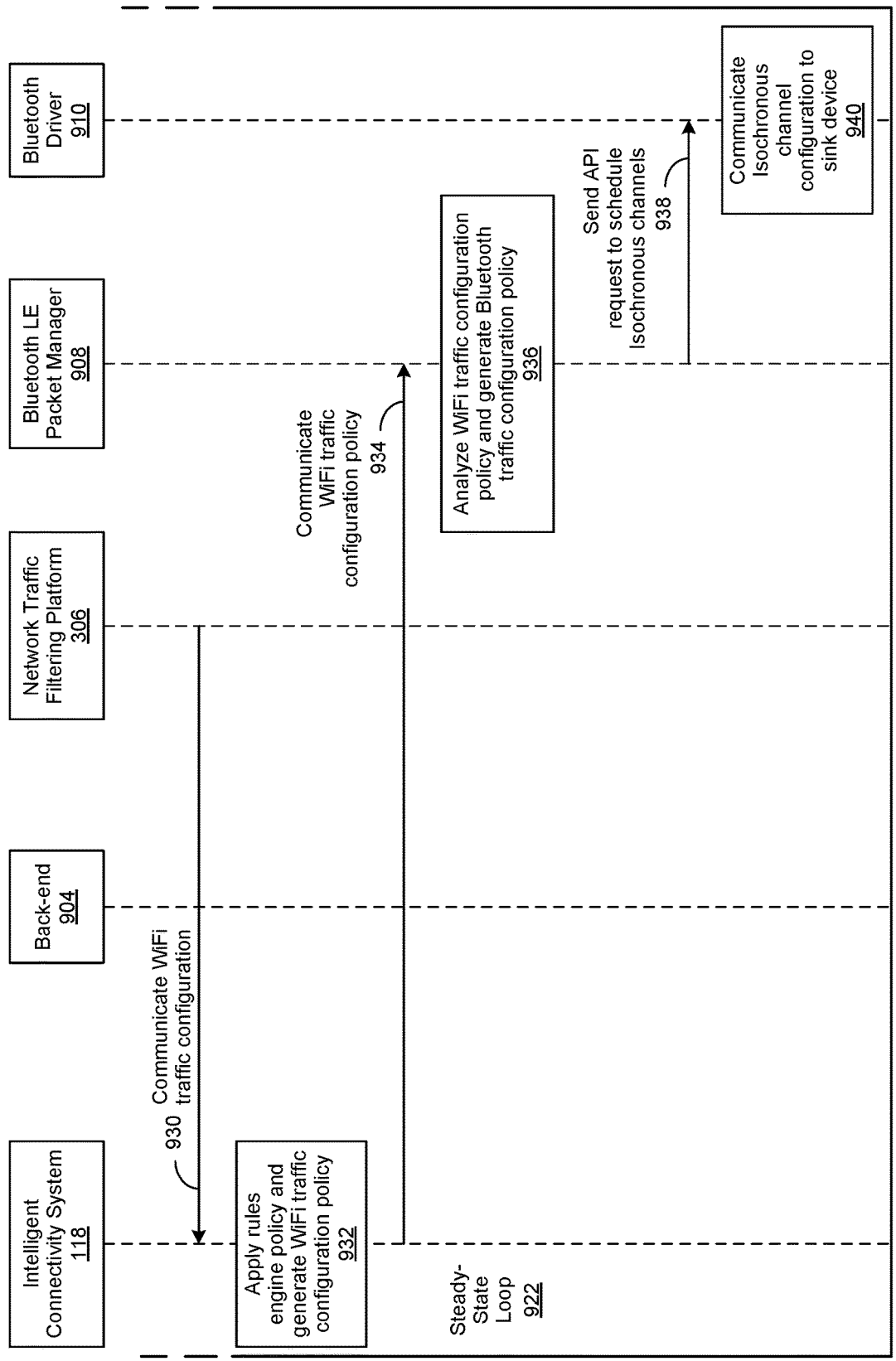

FIGS. 9a and 9b show process flows associated with the performance of Bluetooth network connectivity persistence operations implemented in accordance with an embodiment of the invention. In this embodiment, Bluetooth network connectivity persistence operations are initiated in step 912 by an intelligent connectivity system 118, described in greater detail herein, executing on an associated endpoint device. In certain embodiments, the Bluetooth network connectivity persistence operations may be initiated by a particular operating service (OS) implemented in combination with the intelligent connectivity system 118.

A configuration policy, or a rules engine policy, is then retrieved from the user device's back-end 904 in step 914 to identify the user device context and associated payload type. In certain embodiments, the configuration policy, or the rules engine policy, ma be implemented to contain certain information associated with the type of network link supported (e.g., PAN, WLAN, etc.), the type of traffic that may be routed by each, and so forth. In certain embodiments, the network link may be implemented as a Virtual Private Network (VPN) link.

The configuration policy is then provided in step 916 to a network traffic filtering platform 306, where it is used in step 918 to initiate network connectivity with a particular Bluetooth device. Then, in step 920, a list of Bluetooth devices connected to the user device is determined by a Bluetooth LE packet manager 908 accessing certain information maintained by the operating system (OS) of the user device. Ongoing steady-state loop operations 922 are then initiated by the network traffic filtering platform 306. In turn, a particular Bluetooth sink device is selected in step 924 once its associated audio capabilities have been determined by referencing its associated Bluetooth driver 910.

Once the audio capabilities of the selected Bluetooth sink device have been determined, they are communicated to the Bluetooth LE packet manager 908 in step 926. Thereafter, the network traffic filtering platform 306 is used in step 928 to determine the Target Wait Time (TWT) parameters of the user device's Wireless Fidelity (WiFi) network link. Once determined, the TWT parameters, and other network traffic configuration information, is communicated to the intelligent connectivity system 118 in step 932. Then, in step 932, the intelligent connectivity system 118 applies the rules engine policy to the TWT parameters and other network traffic configuration information to generate a traffic configuration policy, which is then communicated to the Bluetooth LE packet manager 908 in step 934.

In turn, the Bluetooth LE packet manager 908 analyzes the WiFi traffic configuration policy and uses it to generate a corresponding Bluetooth traffic configuration policy in step 936. Thereafter, the Bluetooth LE packet manager 908 sends an application program interface (API) request to the Bluetooth driver 910 in step 938 to schedule the timing of the Bluetooth network link's isochronous (ISO) channels. The ISO channel timing information is then communicated to the Bluetooth sink device in step 940.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a traffic routing operation, comprising:
    establishing a Bluetooth connection, the Bluetooth connection comprising a plurality of Bluetooth packets;
    establishing a WiFi connection, the WiFi connection comprising a plurality of WiFi packets and an associated wait indicator;

identifying a plurality of wake sessions using the associated wait indicator;
configuring a Bluetooth channel configuration; and,
configuring a WiFi channel configuration using the associated wait indicator and the plurality of wake sessions, the configuring the WiFi channel configuration taking into account the Bluetooth channel configuration, the configuring the WiFi channel configuration interleaving the plurality of WiFi packets and the plurality of Bluetooth packets so that no packet collisions occur between the plurality of Bluetooth packets and the plurality of WiFi packets, the interleaving alternating WiFi packets from the plurality of WiFi packets with Bluetooth packets from the plurality of Bluetooth packets.

2. The method of claim 1, wherein:
the wait indicator comprises a WiFi Target Wait Time (TWT) value.

3. The method of claim 2, wherein:
the WiFi TWT value comprises a TWT Wake interval and a TWT wake duration; and,
the TWT Wake interval and the TWT wake duration are taken into consideration when interleaving the plurality of WiFi packets and the plurality of Bluetooth packets.

4. The method of claim 1, wherein:
the Bluetooth channel configuration comprises at an Isochronous Connection Oriented (ICO) Channel configuration.

5. The method of claim 4, wherein:
the ICO Channel configuration comprises at least one of an ICO interval and a Burst number of Bluetooth packets.

6. The method of claim 1, further comprising:
using contextual information of a number of connected Bluetooth devices to arbitrate a WiFi band change for a duration of a session.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
establishing a Bluetooth connection, the Bluetooth connection comprising a plurality of Bluetooth packets;
establishing a WiFi connection, the WiFi connection comprising a plurality of WiFi packets and an associated wait indicator;
identifying a plurality of wake sessions using the associated wait indicator;
configuring a Bluetooth channel configuration; and,
configuring a WiFi channel configuration using the associated wait indicator and the plurality of wake sessions, the configuring the WiFi channel configuration taking into account the Bluetooth channel configuration, the configuring the WiFi channel configuration interleaving the plurality of WiFi packets and the plurality of Bluetooth packets so that no packet collisions occur between the plurality of Bluetooth packets and the plurality of WiFi packets, the interleaving alternating WiFi packets from the plurality of WiFi packets with Bluetooth packets from the plurality of Bluetooth packets.

8. The system of claim 7, wherein:
the wait indicator comprises a WiFi Target Wait Time (TWT) value.

9. The system of claim 8, wherein:
the WiFi TWT value comprises a TWT Wake interval and a TWT wake duration; and,
the TWT Wake interval and the TWT wake duration are taken into consideration when interleaving the plurality of WiFi packets and the plurality of Bluetooth packets.

10. The system of claim 7, wherein:
the Bluetooth channel configuration comprises at an Isochronous Connection Oriented (ICO) Channel configuration.

11. The system of claim 10, wherein:
the ICO Channel configuration comprises at least one of an ICO interval and a Burst number of Bluetooth packets.

12. The system of claim 7, wherein the instructions executable by the processor are further configured for:
using contextual information of a number of connected Bluetooth devices to arbitrate a WiFi band change for a duration of a session.

13. A non-transitory, computer-readable storage medium embodying computer program code, the computer program code comprising computer executable instructions configured for:
establishing a Bluetooth connection, the Bluetooth connection comprising a plurality of Bluetooth packets;
establishing a WiFi connection, the WiFi connection comprising a plurality of WiFi packets and an associated wait indicator;
identifying a plurality of wake sessions using the associated wait indicator;
configuring a Bluetooth channel configuration; and,
configuring a WiFi channel configuration using the associated wait indicator and the plurality of wake sessions, the configuring the WiFi channel configuration taking into account the Bluetooth channel configuration, the configuring the WiFi channel configuration interleaving the plurality of WiFi packets and the plurality of Bluetooth packets so that no packet collisions occur between the plurality of Bluetooth packets and the plurality of WiFi packets, the interleaving alternating WiFi packets from the plurality of WiFi packets with Bluetooth packets from the plurality of Bluetooth packets.

14. The non-transitory, computer-readable storage medium of claim 13, wherein:
the wait indicator comprises a WiFi Target Wait Time (TWT) value.

15. The non-transitory, computer-readable storage medium of claim 14, wherein:
the WiFi TWT value comprises a TWT Wake interval and a TWT wake duration; and,
the TWT Wake interval and the TWT wake duration are taken into consideration when interleaving the plurality of WiFi packets and the plurality of Bluetooth packets.

16. The non-transitory, computer-readable storage medium of claim 13, wherein:
the Bluetooth channel configuration comprises at an Isochronous Connection Oriented (ICO) Channel configuration.

17. The non-transitory, computer-readable storage medium of claim 16, wherein:
the ICO Channel configuration comprises at least one of an ICO interval and a Burst number of Bluetooth packets.

18. The non-transitory, computer-readable storage medium of claim 13, wherein the computer executable instructions are further configured for:
  using contextual information of a number of connected Bluetooth devices to arbitrate a WiFi band change for a duration of a session.

19. The non-transitory, computer-readable storage medium of claim 13, wherein:
  the computer executable instructions are deployable to a client system from a server system at a remote location.

20. The non-transitory, computer-readable storage medium of claim 13, wherein:
  the computer executable instructions are provided by a service provider to a user on an on-demand basis.

\* \* \* \* \*